US009582868B2

United States Patent
Hirayama (10) Patent No.: US 9,582,868 B2
(45) Date of Patent: Feb. 28, 2017

(54) IMAGE PROCESSING APPARATUS THAT APPROPRIATELY PERFORMS TONE CORRECTION IN LOW-ILLUMINANCE ENVIRONMENT, IMAGE PROCESSING METHOD THEREFOR, AND STORAGE MEDIUM

(71) Applicant: CANON KABUSHIKI KAISHA, Tokyo (JP)

(72) Inventor: Shingo Hirayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/883,955

(22) Filed: Oct. 15, 2015

(65) Prior Publication Data
US 2016/0110855 A1 Apr. 21, 2016

(30) Foreign Application Priority Data
Oct. 21, 2014 (JP) .................................. 2014-214585

(51) Int. Cl.
G06K 9/36 (2006.01)
G06T 5/40 (2006.01)
G06T 5/00 (2006.01)

(52) U.S. Cl.
CPC ........ *G06T 5/40* (2013.01); *G06T 5/009* (2013.01)

(58) Field of Classification Search
CPC ............ G06T 5/40; G06T 5/009; G06T 5/007; H04N 1/4074
See application file for complete search history.

(56) References Cited

U.S. PATENT DOCUMENTS

| 2003/0002736 A1* | 1/2003 | Maruoka | G06T 5/009 382/168 |
| 2004/0004666 A1* | 1/2004 | Sano | H04N 5/2355 348/254 |
| 2004/0190789 A1* | 9/2004 | Liu | G06T 5/009 382/274 |
| 2006/0061842 A1* | 3/2006 | Oka | H04N 9/69 358/522 |

(Continued)

FOREIGN PATENT DOCUMENTS

JP 2006-098614 A 4/2006

*Primary Examiner* — Li Liu
(74) *Attorney, Agent, or Firm* — Fitzpatrick, Cella, Harper & Scinto (57) ABSTRACT

An image processing apparatus includes a histogram detecting unit that detects a luminance histogram from an input image. A determination unit determines control points for use in generation of a tone curve based on such a luminance that a percentage from a low-luminance side in the detected luminance histogram is equal to a first value, and a percentage from a high-luminance side in the detected luminance histogram is equal to a second value. A tone curve generating unit generates a tone curve based on the calculated control points. An image processing unit performs image processing based on the tone curve. A judgment unit judges whether illuminance of a shooting environment is low. A point light source detecting unit detects a component originating from a point light source from the luminance histogram. When the illuminance of the shooting environment is low, the determination unit makes the second value greater.

7 Claims, 7 Drawing Sheets (56) References Cited

U.S. PATENT DOCUMENTS

| | | | | |
|---|---|---|---|---|
| 2006/0119713 A1* | 6/2006 | Deguchi | ............... | H04N 1/6005 348/231.7 |
| 2007/0092136 A1* | 4/2007 | Zhao | ....................... | G06T 5/007 382/169 |
| 2009/0324074 A1* | 12/2009 | Dembo | .................... | G06T 5/009 382/168 |
| 2010/0329553 A1* | 12/2010 | Shiokawa | ................ | H04N 9/77 382/167 |
| 2011/0058738 A1* | 3/2011 | Miyazawa | .............. | G06T 5/008 382/168 |
| 2011/0235945 A1* | 9/2011 | Wakazono | ............. | H04N 5/217 382/300 |
| 2016/0035286 A1* | 2/2016 | Kawaguchi | .......... | G09G 3/3406 345/212 |
| 2016/0104273 A1* | 4/2016 | Urakami | ................... | G06T 5/40 382/169 |

* cited by examiner

IMAGE PROCESSING APPARATUS THAT APPROPRIATELY PERFORMS TONE CORRECTION IN LOW-ILLUMINANCE ENVIRONMENT, IMAGE PROCESSING METHOD THEREFOR, AND STORAGE MEDIUM

CLAIM OF PRIORITY

This application claims the benefit of Japanese Patent Application No. 2014-214585, filed Oct. 21, 2014, which is hereby incorporated by reference herein in its entirety.

BACKGROUND OF THE INVENTION

Field of the Invention

The present invention relates to an image processing apparatus, an image processing method, and a storage medium, and, in particular, to an image processing apparatus and an image processing method that reduce the effects of fog, mist, and so forth, on an image taken by shooting, as well as a storage medium.

Description of the Related Art

Conventional monitoring cameras are required to take images with high visibility by shooting in various environments, but when an object is foggy or misty, an image has low contrast and lacks visibility. Thus, Japanese Laid-Open Patent Publication (Kokai) No. 2006-98614 proposes a method in which, based on a luminance histogram of an image, a low-tone part and a high-tone part in a luminance correction curve are computed, and an endpoint of the computed high-tone part on a low-tone side and an endpoint of the computed low-tone part on a high-tone side in the luminance correction curve are connected together to obtain a half-tone part. Luminance levels of the image are corrected across the whole tone range using the computed low-tone part, half-tone part, and high-tone part in the luminance correction curve.

On the other hand, the degree of reduction in the contrast of an image constantly changes, because the densities of fog and mist are not constant, and may vary as time passes. Thus, in a shooting environment that is foggy and misty, it is useful to adaptively change the degree of contrast enhancement according to a luminance histogram of an image taken by shooting and thus, improve visibility of the image.

The technique disclosed in Japanese Laid-Open Patent Publication (Kokai) No. 2006-98614, however, does not deal with changes in a luminance histogram occurring with changes in illuminance of a shooting environment. When illuminance of a shooting environment is low, the peak of a luminance histogram shifts toward a low-luminance side, and there tends to be noise components on a high-luminance side. As a result, the degree of contrast enhancement on the high-luminance side is calculated based on the luminance histogram including the noise components, and hence, contrast may be poorly enhanced on the high-luminance side, making appropriate tone correction impossible.

SUMMARY OF THE INVENTION

The present invention provides an image processing apparatus and an image processing method that appropriately perform tone correction in a low-illuminance environment, as well as a storage medium.

Accordingly, the present invention provides an image processing apparatus comprising a histogram detecting unit configured detect a luminance histogram from an input image, a determination unit configured to determine control points for use in generation of a tone curve based on such a luminance that a percentage from a low-luminance side in the luminance histogram detected by the histogram detecting unit is equal to a first value, and such a luminance that a percentage from a high-luminance side in the luminance histogram detected by the histogram detecting unit is equal to a second value, a tone curve generating unit configured to generate a tone curve based on the control points determined by the determination unit, an image processing unit configured to perform image processing based on the tone curve generated by the tone curve generating unit, and a judgment unit configured to judge whether illuminance of a shooing environment is low, wherein when the judgment unit judges that illuminance of the shooing environment is low in determining the control points for use in generation of the tone curve, the determination unit makes the second value greater than in a case when the judgment unit does not judge that illuminance of the shooing environment is low.

According to the present invention, when illuminance of a shooing environment is low, a high-luminance side frequency percentage for calculating a control point for use in generation of a tone curve on a high-luminance side is made greater than in a case when illuminance of the shooing environment is not low. As a result, tone correction is appropriately performed in a low-illuminance environment.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
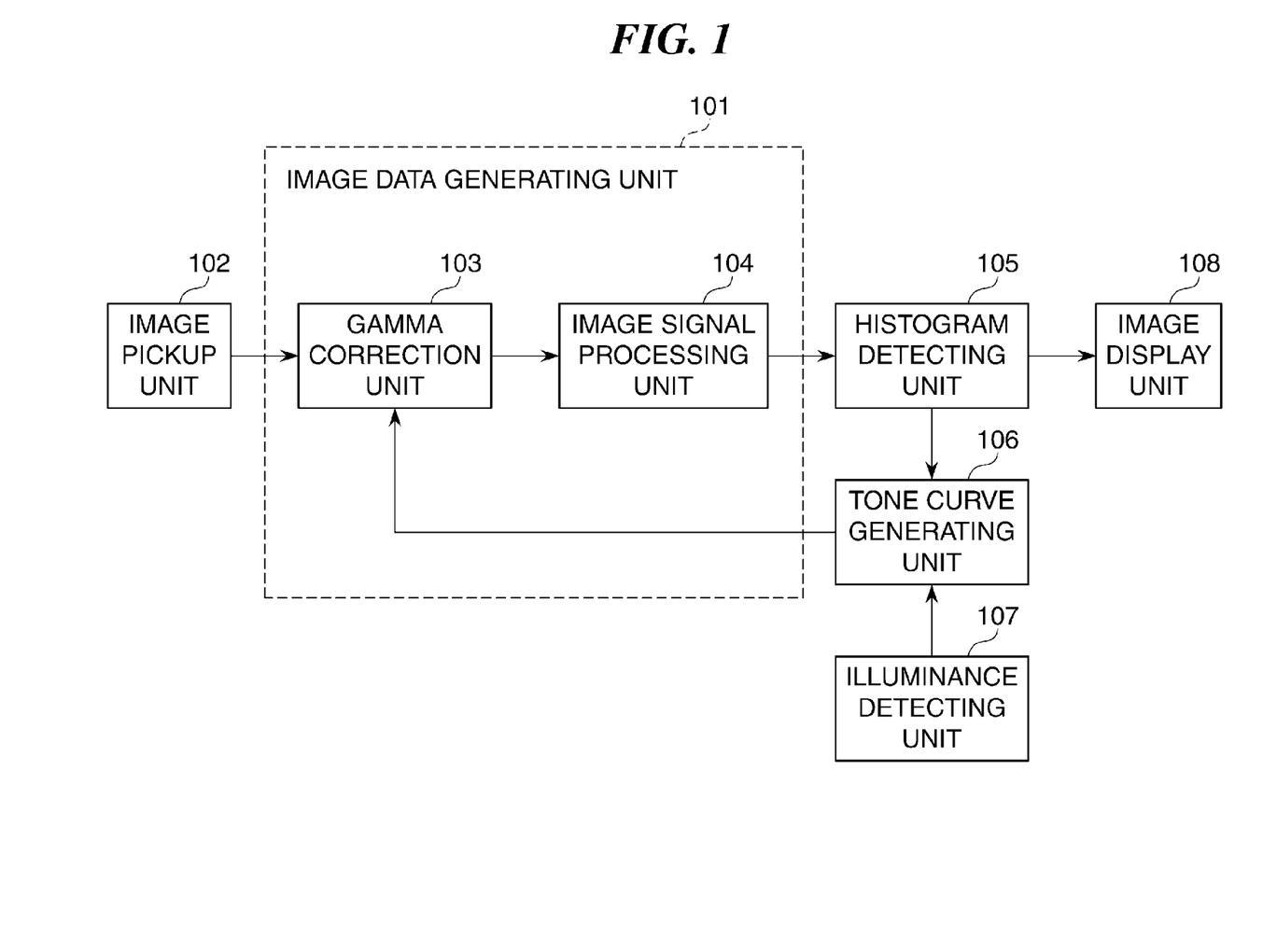
FIG. 1 is a block diagram schematically showing an arrangement of an image processing apparatus according to a first embodiment of the present invention.

FIG. 1 is a block diagram schematically showing an arrangement of an image processing apparatus according to a first embodiment of the present invention. The image processing apparatus according to the first embodiment of the present invention is, for example, a digital camera, a network camera, a smartphone, or a tablet terminal. It should be noted that component elements other than constituent features relating to tone correction in the image processing apparatus are omitted from FIG. 1.

An image pickup unit 102 in FIG. 1 has a lens group, an IRCF (infrared ray cut filter), an image pickup device, a CDS (correlated double sampling) circuit, an AGC (automatic gain control) amplifier, and an A/D converter, which are not shown.

In the image pickup unit 102, when an object, not shown, is shot, an optical image passing through the lens group and the IRCF is formed on the image pickup device comprised of a CCD sensor, a CMOS sensor, or the like. The image pickup device performs photoelectric conversion of the formed optical image and outputs it as an analog image signal. The CDS circuit performs, for example, correlated double sampling on an electrical signal input from the image pickup device. The AGC amplifier carries out, for example, an amplification process on an electrical signal input from the CDS circuit.

The A/D converter converts an analog signal, which has been subjected to the amplification process by the AGC amplifier, into a digital signal. An image data generating unit 101 subjects the digital signal obtained as a result of the conversion to image processing such as color conversion, AE processing, WB processing, and gamma correction. Image data that has been subjected to predetermined image processing is displayed on an image display unit 108.

The image data generating unit 101 has a gamma correction unit 103 that performs gamma correction on image data input from the image pickup unit 102, and an image signal processing unit 104 that performs image signal processing other than gamma correction.

A histogram detecting unit 105 detects a luminance histogram showing the distribution of luminance levels from image data input from the image signal processing unit 104 and outputs data on the luminance histogram to a tone curve generating unit 106 while outputting the image data to the image display unit 108.

The tone curve generating unit 106 calculates a tone curve based on luminance histogram data input from the histogram detecting unit 105 and outputs the calculated tone curve to the gamma correction unit 103. The gamma correction unit 103 carries out a gamma correction process on image data by reflecting the tone curve input from the tone curve generating unit 106 on a gamma curve.

An illuminance detecting unit 107 detects illuminance of a shooting environment for the image processing apparatus and outputs the detected illuminance to the tone curve generating unit 106. It should be noted that the illuminance detecting unit 107 may have any configuration and use any method, as long as it has the function of detecting illuminance of a shooting environment. For example, the illuminance detecting unit 107 may detect illuminance of a shooting environment based on a luminance level of image data output from the image signal processing unit 104, or may have an illuminance sensor for detecting illuminance, and detect illuminance of a shooting environment based on an output from the illuminance sensor.

Figure 2:
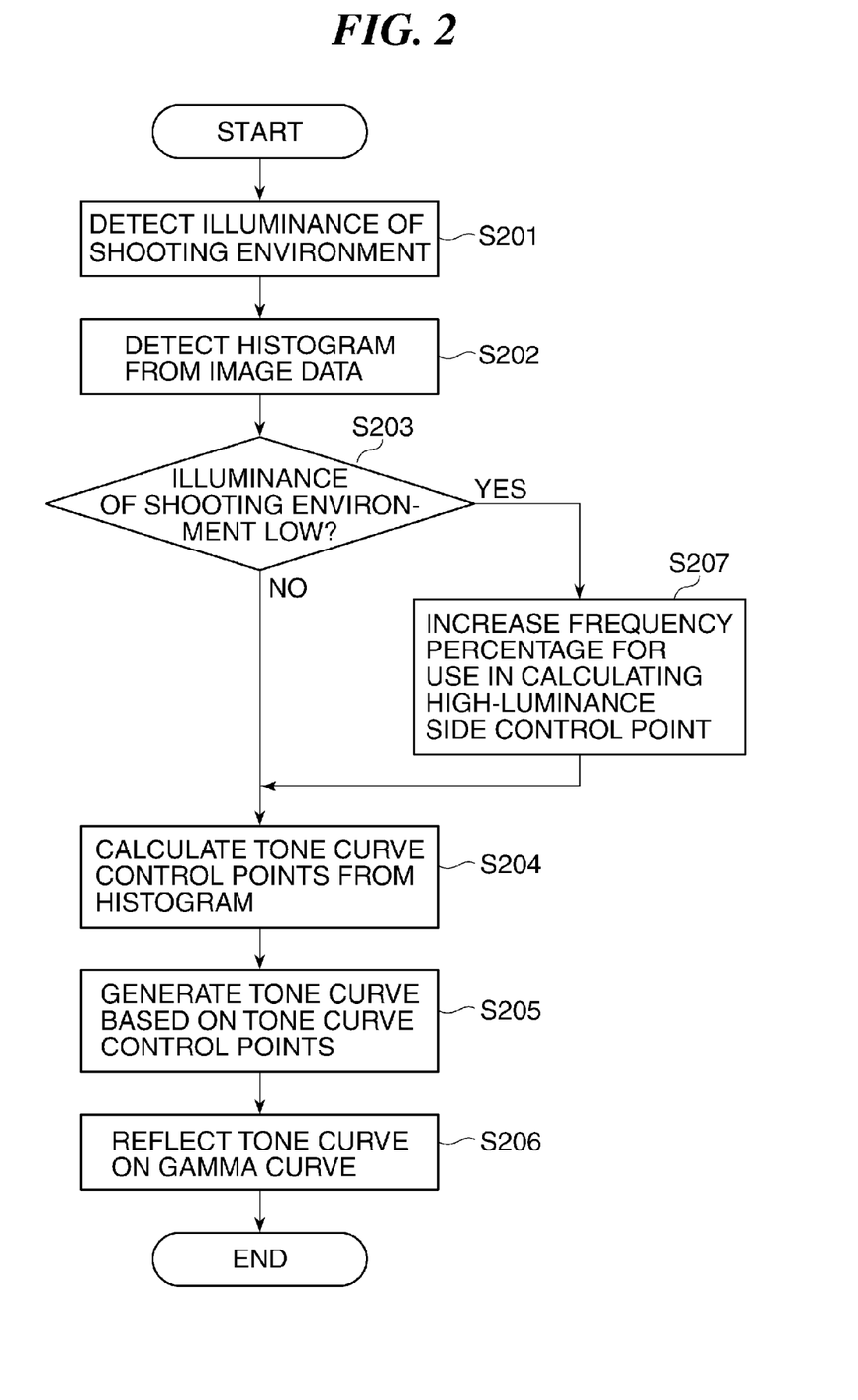
FIG. 2 is a flowchart showing an exemplary tone correction process that is carried out by the image processing apparatus shown in FIG. 1.

Referring next to FIG. 2, a description will be given of a tone correction process that is carried out by the image processing apparatus in FIG. 1.

FIG. 2 is a flowchart showing an exemplary tone correction process that is carried out by the image processing apparatus in FIG. 1. It should be noted that this process is carried out by the components in FIG. 1 working in cooperation with one another.

Referring to FIG. 2, in step S201, the luminance detecting unit 107 detects illuminance of a shooting environment for the image processing apparatus.

Next, in step S202, the histogram detecting unit 105 detects a luminance histogram from image data input from the image data generating unit 101.

Then, in step S203, the tone curve generating unit 106 judges whether or not illuminance of the shooting environment detected in the step S201 is low. For this judgment as to the illuminance, an AGC gain value, for example, is used, and when the AGC gain value is not less than a predetermined value, it may be judged that the illuminance is low, and when the illuminance level detected by the illuminance detecting unit 107 is not more than a predetermined value, it may be judged that the illuminance is low. Any other methods may be used. When it is judged that illuminance of the shooting environment is low, the process proceeds to step S207, and on the other hand, when it is judged that illuminance of the shooting environment is not low, the process proceeds to step S204.

Figure 3A:
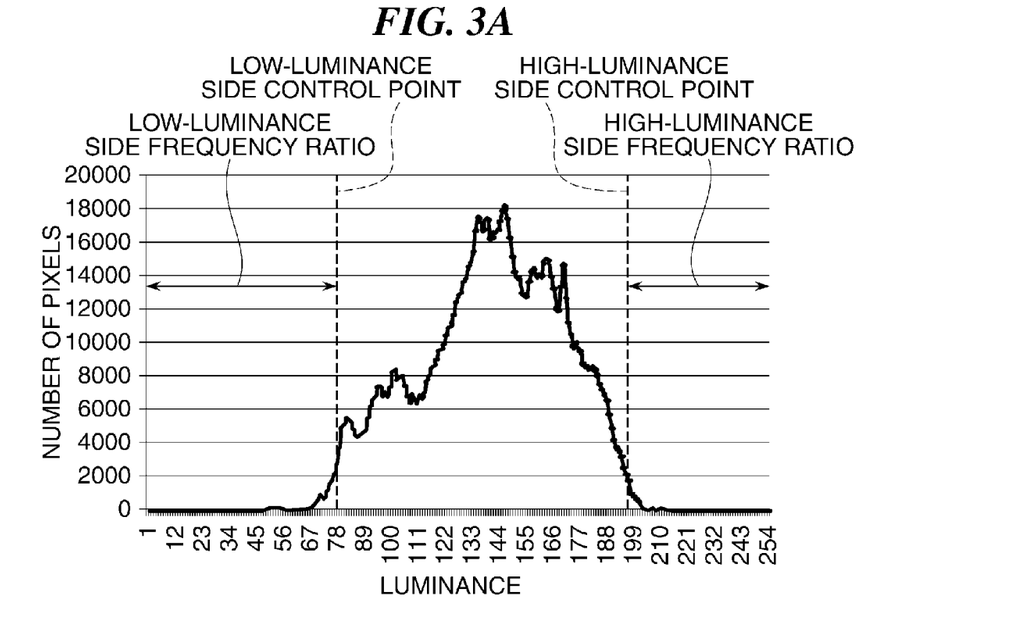
FIG. 3A is a view showing control points on a high-luminance side and a low-luminance side and exemplary frequency percentages on the high-luminance side and the low-luminance side in a luminance histogram.

In step S204, the tone curve generating unit 106 calculates (determines) control points, which are for use in generation of a tone curve, from the luminance histogram detected by the histogram detecting unit 105. As shown in FIG. 3A, control points for use in generation of a tone curve are calculated from the luminance histogram based on frequency percentages set in advance (a high-luminance side frequency percentage, a low-luminance side frequency percentage).

Figure 3B:
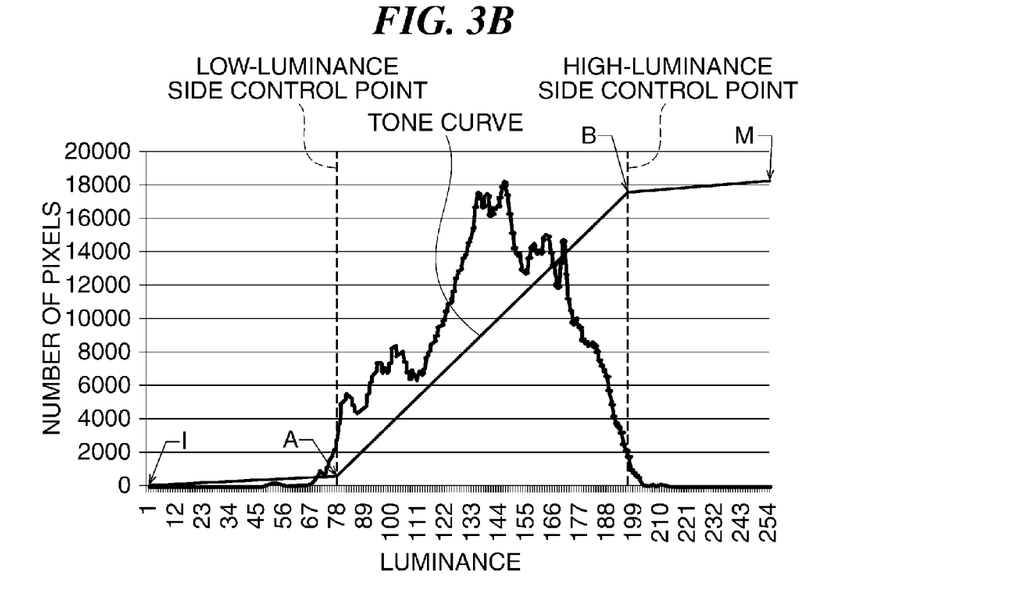
FIG. 3B is a view showing an exemplary tone curve generated from the control points on the high-luminance side and the low-luminance side in the luminance histogram.

More specifically, control points for use in generation of a tone curve are calculated based on such a luminance that a percentage (frequency percentage) on a low-luminance side in the luminance histogram detected by the histogram detecting unit 105 is equal to a first value, and such a luminance that the percentage (frequency percentage) on a high-luminance side in the luminance histogram detected by the histogram detecting unit 105 is equal to a second value. For example, when the frequency percentages (the first value and the second value) are set to 5%, luminance that corresponds to 5% on each of the low-luminance side and the high-luminance side is regarded as a control point. The tone curve generating unit 106 then generates a tone curve as shown in FIG. 3B (step S205 in FIG. 2) using an equation below (equation 1) based on the control points for use in generation of a tone curve.

[Mathematical Expression 1]

$$I_y = \begin{cases} \dfrac{A_y}{A_x} I_x & (0 \leq I_x < A_x) \\ \dfrac{B_y - A_y}{B_x - A_x}(I_x - A_x) + A_y & (A_x \leq I_x < B_x) \\ \dfrac{M_y - B_y}{M_x - B_x}(I_x - B_x) + B_y & (B_x \leq I_x \leq M_x) \end{cases} \quad \text{(Equation 1)}$$

Ix, Iy: x, y coordinates on a tone curve;
Ax, Ay: x, y coordinates at a point A (a control point on a low-luminance side) on the tone curve;
Bx, By: x, y coordinates at a point B (a control point on a high-luminance side) on the tone curve; and
Mx, My: x, y coordinates at a point M on the tone curve.

The x coordinate and the y coordinate on the tone curve correspond to an input value and an output value, respectively, and the x coordinate and the y coordinate at the point M correspond to a maximum input value and a maximum output value, respectively.

As described above, the equation 1 indicates that when a generated tone curve is applied to an arbitrary input value Ix, an output value Iy is obtained.

Then, in step S206, the gamma correction unit 103 reflects the tone curve generated in the step S205 on a gamma curve to determine a gamma curve for contrast enhancement by calculation using an equation below (equation 2).

[Mathematical Expression 2]

$$h(x)=g(t(x))$$

h(x): gamma curve for contrast enhancement
g(x): normal gamma curve
t(x): tone curve $$x=x_0, x_1, \ldots, x_{24} \quad \text{(Equation 2)}$$

Thus, by carrying out the gamma correction process on image data using the gamma curve for contrast enhancement calculated in the step S206, the contrast of an image that has been reduced due to fog or mist is enhanced to improve the visibility of the image.

Figure 4A:
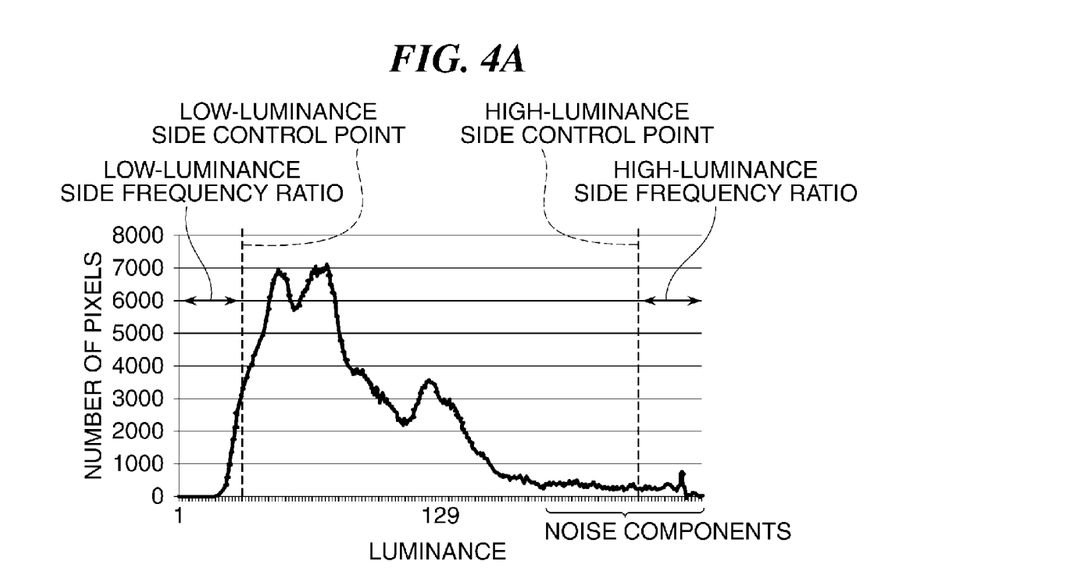
FIG. 4A is a view showing an exemplary luminance histogram of an image taken by shooting in a low-illuminance shooting environment.

In step S207, the tone curve generating unit 106 increases the high-luminance side frequency percentage for calculating a control point for use in generation of a tone curve on the high-luminance side. When illuminance of the shooting environment is low, the peak of a luminance histogram tends to shift toward the low-luminance side as shown in FIG. 4A, and there tends to be noise components on the high-luminance side. From such a luminance histogram, a control point for use in generation of a tone curve on the high-luminance side cannot be appropriately calculated due to the noise components, although a control point on the low-luminance side is appropriately calculated.

Figure 4B:
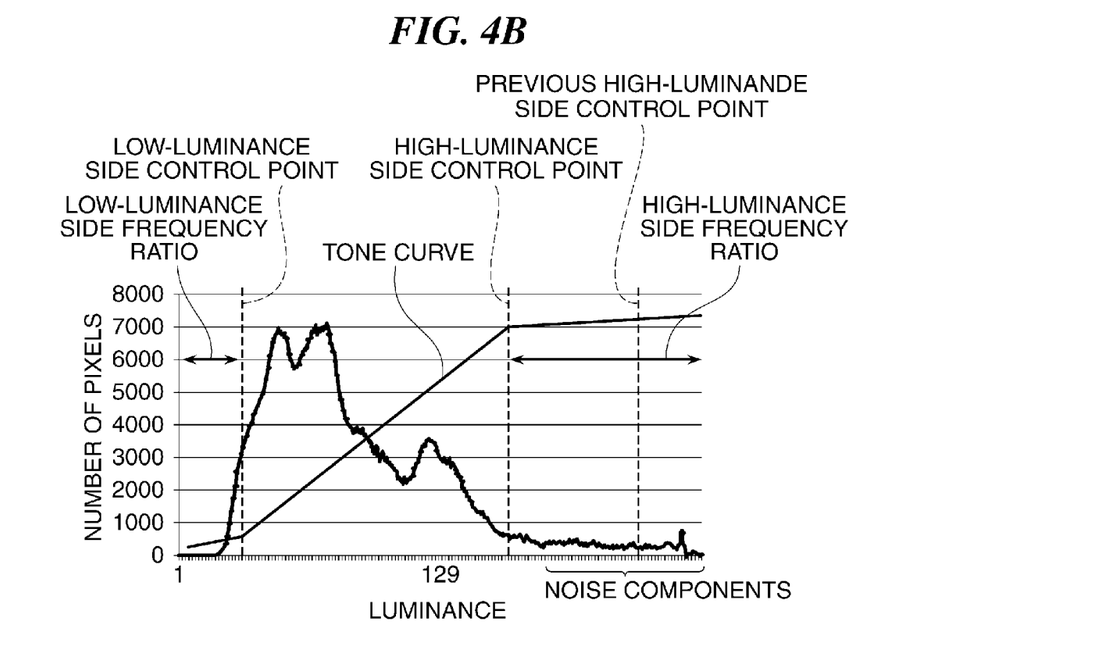
FIG. 4B is a view showing control points on a high-luminance side and a low-luminance side, and exemplary frequency percentages on the high-luminance side and the low-luminance side in a luminance histogram of the image taken by shooting in the low-illuminance shooting environment.

Therefore, when illuminance of the shooting environment is low, the high-luminance side frequency percentage is set to a greater value than in a case when illuminance of the shooting environment is not low. For example, assuming that the high-luminance side frequency percentage for calculating a control point for use in generation of a tone curve on the high-luminance side when illuminance of the shooting environment is not low is set to 5%, the high-luminance side frequency percentage is 15% when illuminance of the shooting environment is low. At this time, the low-luminance side frequency percentage is not changed according to whether or not it is judged that illuminance of the shooting environment is low. As a result, as shown in FIG. 4B, a control point for use in generation of a tone curve on the high-luminance side is set at a point that is less affected by the noise components, and as a result, appropriate control points for a tone curve are calculated. After the control points for use in generation of a tone curve are calculated, the same processes as those in steps S204 to S206 described above are carried out, and therefore, a description thereof is omitted.

According to the embodiment described above, in a case when illuminance of a shooting environment is low, control is provided such that a high-luminance side frequency percentage for calculating a control point for use in generation of a tone curve on a high-luminance side is greater than in a case when illuminance of the shooting environment is not low. This enables contrast enhancement that reduces the effects of noise components on the high-luminance side of a luminance histogram in low-illuminance conditions and appropriately improves the visibility of an image.

In the first embodiment described above, when illuminance of a shooting environment is low, there tends to be noise components on a high-luminance side in a luminance histogram, and hence, tone correction is performed such that a high-luminance side frequency percentage is greater than in a case when illuminance of the shooting environment is not low.

On the other hand, in shooting in a low-illuminance environment, there tends to be not only noise components, but also, components originating from a point light source, such as a street light, on the high-luminance side of a luminance histogram. From a luminance histogram in which components originating from a point light source are present, a control point for use in generation of a tone curve on the high-luminance side cannot be appropriately calculated due to noise components and the components originating from the point light source, although a control point on the low-luminance side is appropriately calculated.

Accordingly, for the second embodiment, tone correction is performed with consideration given to noise components and components originating from a point light source, which are present in a luminance histogram. It should be noted that the same component elements as those in the first embodiment described above are designated by the same reference symbols, and a description thereof is omitted. Only features different from those in the first embodiment described above will be described below.

Figure 5:
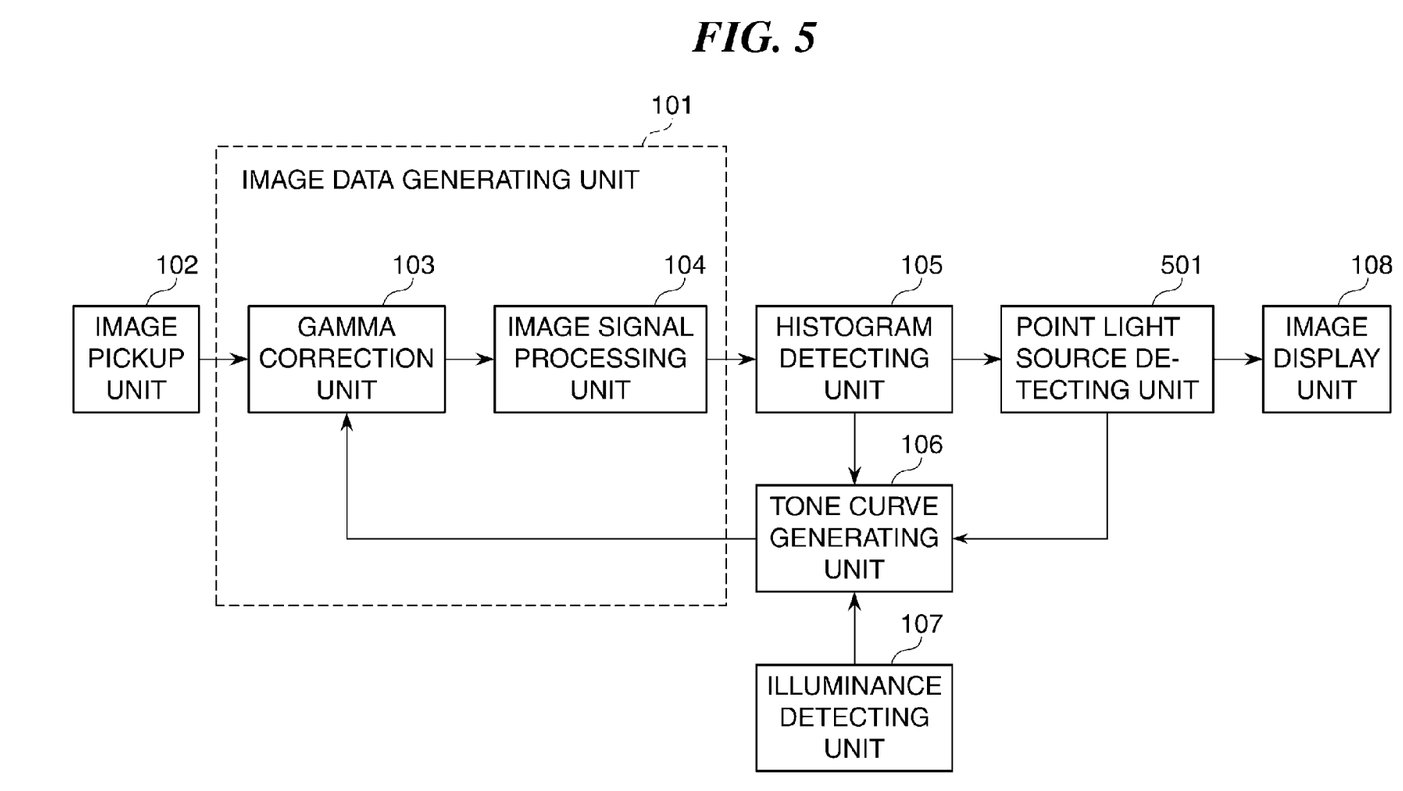
FIG. 5 is a block diagram schematically showing an arrangement of an image processing apparatus according to a second embodiment of the present invention.

FIG. 5 is a block diagram schematically showing an arrangement of an image processing apparatus according to a second embodiment of the present invention. It should be noted that other component elements of the image processing apparatus are omitted from FIG. 5.

The image processing apparatus in FIG. 5 is constructed by adding only a point light source detecting unit 501 to the image processing apparatus in FIG. 1 according to the first embodiment described above. The point light source detecting unit 501 detects components originating from a point light source from a luminance histogram and outputs a result of the detection to the tone curve generating unit 106. In such a detection of components originating from a point light source, for example, areas with luminance values of 240 or more in a luminance histogram may be regarded as components originating from a point light source. It should be noted that the point light source detecting unit 501 may have any configuration and use any method, as long as it has the function of detecting components originating from a point light source.

Figure 6:
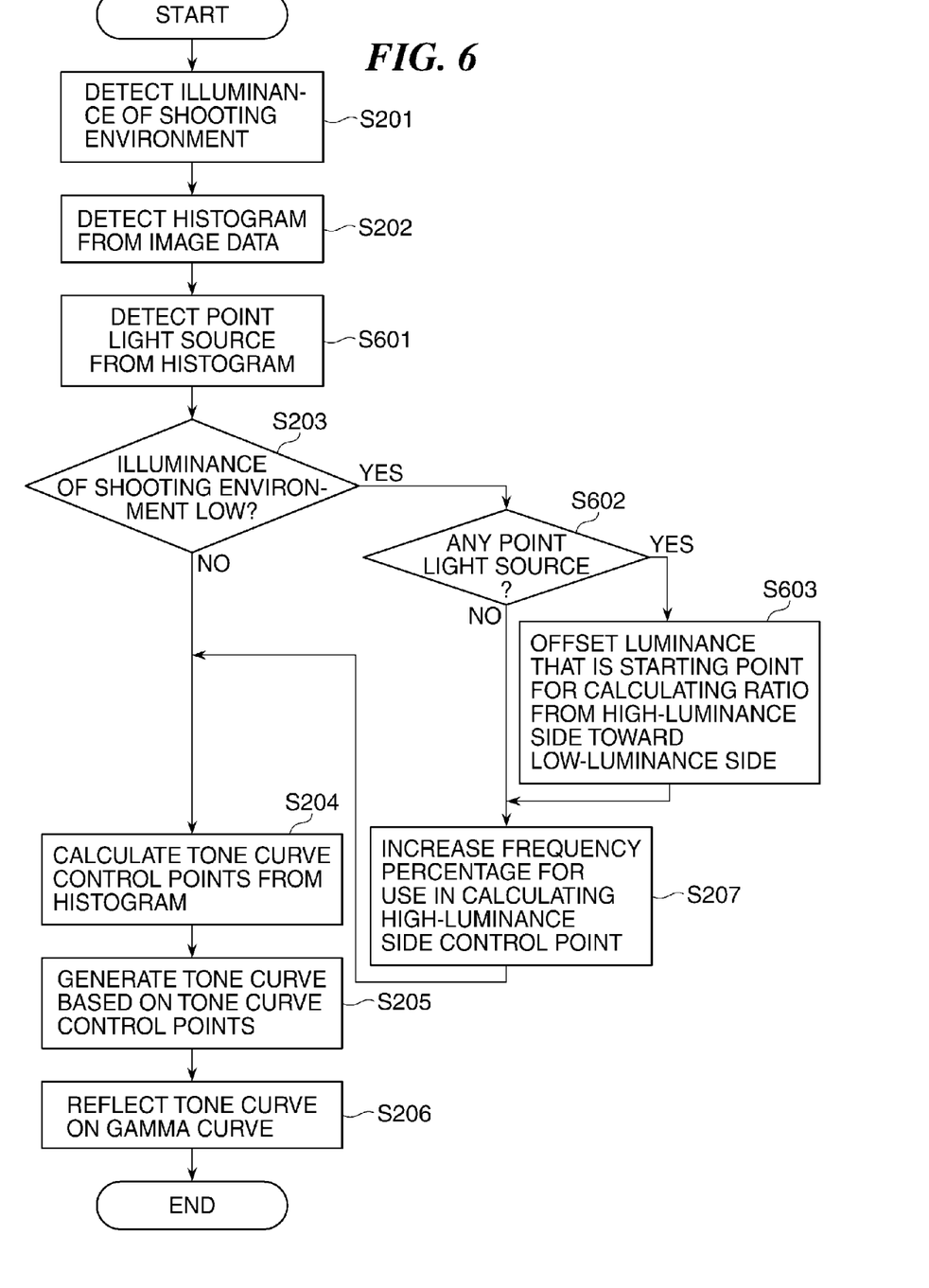
FIG. 6 is a flowchart showing an exemplary tone correction process according to the second embodiment of the present invention.

FIG. 6 is a flowchart showing an exemplary tone correction process according to a second embodiment of the present invention. It should be noted that this process is carried out by the components shown in FIG. 5 working in cooperation with one another. The same steps as those shown in the flowchart of FIG. 2 are designated by the same step numbers, and a description thereof is omitted.

Referring to FIG. 6, in step S601, the point light source detecting unit 501 detects components originating from a point light source from a luminance histogram detected by the histogram detecting unit 105.

Next, in step S203, the tone curve generating unit 106 judges whether or not illuminance of a shooting environment detected in the step S201 is low. When it is judged that illuminance of the shooting environment is low, the process proceeds to step S602, and on the other hand, when it is judged that illuminance of a shooting environment is not low, the process proceeds to step S204.

In step S602, when any component originating from a point light source was detected in the step S601, the process proceeds to step S603. On the other hand, when no component originating from the point light source was detected in step S601, the process proceeds to step S207.

Figure 7:
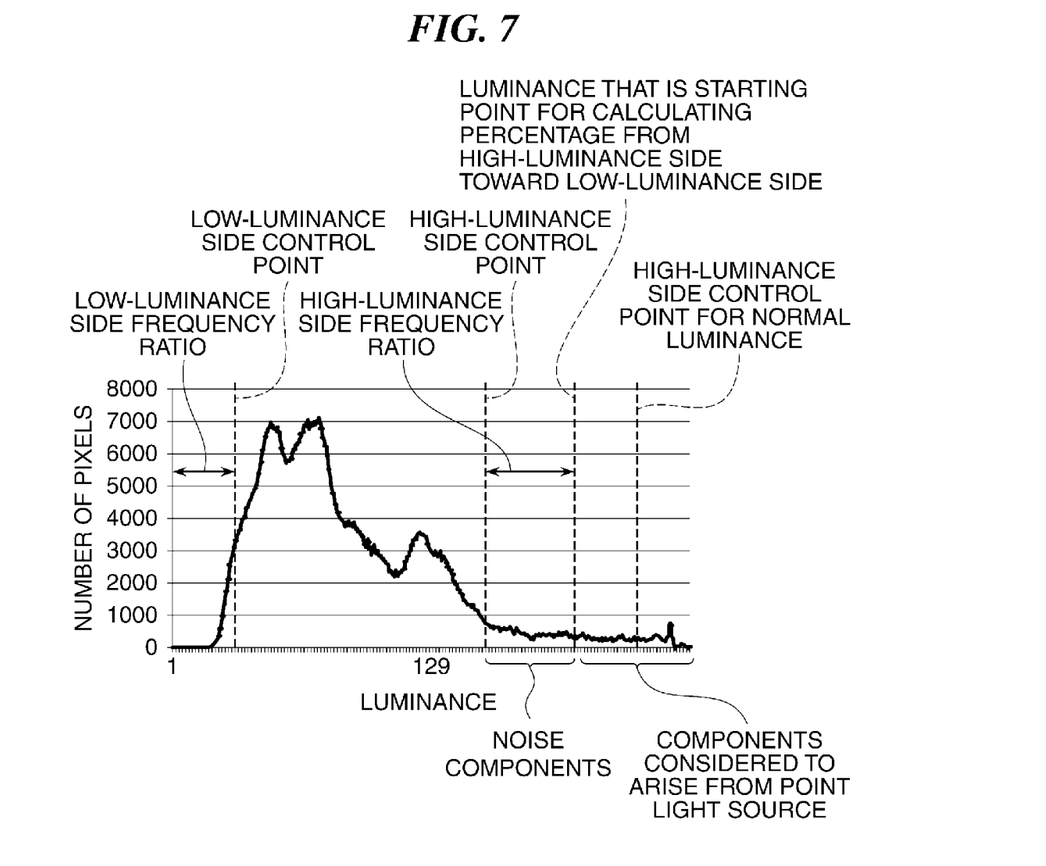
FIG. 7 is a view showing exemplary control points on a high-luminance side and a low-luminance side and exemplary frequency percentages on the high-luminance side, and the low-luminance side in a luminance histogram of the image taken by shooting in a low-illuminance shooting environment affected by a point light source.

In step S603, the tone curve generating unit 106 offsets a luminance, which is a starting point in calculating a percentage from the high-luminance side, toward the low-luminance side. Namely, when a percentage from the high-luminance side is calculated, no area with a luminance value of 240 or more assumed as a point light source is not taken into account. For example, control points for use in generation of a tone curve are calculated with luminance values of 239 or less being taken into account for a percentage from the high-luminance side relative to a luminance value of 240 used to detect a component originating from the point light source. Then, as shown in FIG. 7, a control point for use in generation of a tone curve on the high-luminance side is set at a point less affected by the point light source and noise components, and hence, appropriate control points for use in generation of a tone curve are calculated.

According to the second embodiment described above, in addition to the arrangement of the first embodiment, when it is judged that any component originating from a point light source is included in a luminance histogram, a luminance that is a starting point in calculating a percentage from the high-luminance side is shifted toward the low-luminance side, so as to exclude an area including the component originating from the point light source from the luminance histogram. At this time, a luminance that is a starting point in calculating a percentage from the low-luminance side is not changed according to whether or not any component originating from a point light source is included in the luminance histogram. This enables contrast enhancement with reduced affects of the point light source and appropriately improves the visibility of an image.

Moreover, although in the two embodiments described above, an image processing apparatus having the image pickup function, that is, an image pickup apparatus is used, an image processing apparatus may have no image pickup function. When an image processing apparatus has no image pickup function, the correction process described above should be carried out for an image input from external equipment. It should be noted that in an image processing apparatus with the image pickup function, the correction process described above may be carried out for an image input from external equipment.

Further, although in the two embodiments described above, it is arranged such that gamma correction is performed before a luminance histogram is detected, it may be arranged such that gamma correction is performed after a luminance histogram is detected. When it is arranged such that gamma correction is performed before a luminance histogram is detected, a gamma curve on which a tone curve generated based on a luminance histogram of an image, from which the luminance histogram has been detected is reflected, is not allowed to be used for the image. Thus, the gamma curve, on which the generated tone curve is reflected, is used first for an image input next after the image from which the luminance histogram has been detected. On the other hand, when it is arranged such that gamma correction is performed after a luminance histogram is detected, a gamma curve on which a tone curve generated based on a luminance histogram of an image from which the luminance histogram has been detected is allowed to be used for the image.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
   a histogram detecting unit configured detect a luminance histogram from an input image;
   a determination unit configured to determine control points for use in generation of a tone curve based on such a luminance that a percentage from a low-luminance side in the luminance histogram detected by said histogram detecting unit is equal to a first value, and such a luminance that a percentage from a high-luminance side in the luminance histogram detected by said histogram detecting unit is equal to a second value;
   a tone curve generating unit configured to generate a tone curve based on the control points calculated by said determination unit;
   an image processing unit configured to perform image processing based on the tone curve generated by said tone curve generating unit;
   a judgment unit configured to judge whether illuminance of a shooting environment is low; and a point light source detecting unit configured to detect a component originating from a point light source from the luminance histogram, wherein, when said judgment unit judges that illuminance of the shooting environment is low in determining the control points for use in generation of the tone curve, said determination unit makes the second value greater than in a case when said judgment unit does not judge that illuminance of the shooting environment is low, wherein, when said point light source detecting unit detects a component originating from a point light source, said determination unit changes a luminance, which is a starting point in determining a percentage from the high-luminance side, to a lower luminance side than in a case when said point light source detecting unit detects no component originating from a point light source, and wherein said histogram detecting unit, said determination unit, said tone curve generating unit, said image processing unit, said judgment unit, and said point light source detecting unit are implemented by at least one processor executing at least one program recorded on a memory.

2. An image processing apparatus according to claim 1, wherein, in determining the control points for use in generation of the tone curve, said determination unit does not change the first value according to whether said judgment unit judges that illuminance of the shooting environment is low.

3. An image processing apparatus according to claim 1, wherein, according to whether said point light source detecting unit detects a component originating from a point light source, said determination unit does not change a luminance that is a starting point in determining a percentage from the low-luminance side.

4. An image processing apparatus according to claim 1, wherein said image processing unit performs image processing using a gamma curve corrected based on the tone curve generated by said tone curve generating unit.

5. An image processing apparatus according to claim 1, further comprising an image pickup unit configured to taken an image of an object,
wherein said histogram detecting unit detects a luminance histogram from an image obtained by said image pickup unit, and
wherein said image pickup unit is implemented by the at least one processor executing the at least one program recorded on the memory.

6. An image processing method comprising:
a histogram detecting step of detecting a luminance histogram from an input image;
a determination step of determining control points for use in generation of a tone curve based on such a luminance that a percentage from a low-luminance side in the luminance histogram detected in said histogram detecting step is equal to a first value, and such a luminance that a percentage from a high-luminance side in the luminance histogram detected in said histogram detecting step is equal to a second value;
a tone curve generating step of generating a tone curve based on the control points determined in said determination step;
an image processing step of performing image processing based on the tone curve generated in said tone curve generating step;
a judgment step of judging whether illuminance of a shooting environment is low; and a point light source detecting step of detecting a component originating from a point light source from the luminance histogram, wherein, in said determination step, when said judgment step judges that illuminance of the shooting environment is low in determining the control points for use in generation of the tone curve, the second value is made greater than in a case when said judgment step does not judge that illuminance of the shooting environment is low, wherein, when said point light source detecting step detects a component originating from a point light source, said determination step changes a luminance, which is a starting point in determining a percentage from the high-luminance side, to a lower luminance side than in a case when said point light source detecting step detects no component originating from a point light source, and wherein said histogram detecting step, said determination step, said tone curve generating step, said image processing step, said judgment step, and said point light source detecting step are implemented by at least one processor executing at least one program recorded on a memory.

7. A non-transitory computer-readable storage medium storing a program for causing a computer to execute an image processing method which is executed by an image processing apparatus, the method comprising:
a histogram detecting step of detecting a luminance histogram from an input image;
a determination step of determining control points for use in generation of a tone curve based on such a luminance that a percentage from a low-luminance side in the luminance histogram detected in the histogram detecting step is equal to a first value, and such a luminance that a percentage from a high-luminance side in the luminance histogram detected in the histogram detecting step is equal to a second value;
a tone curve generating step of generating a tone curve based on the control points determined in the determination step;
an image processing step of performing image processing based on the tone curve generated in the tone curve generating step;
a judgment step of judging whether illuminance of a shooting environment is low; and
a point light source detecting step of detecting a component originating from a point light source from the luminance histogram, wherein, in the determination step, when the judgment step judges that illuminance of the shooting environment is low in determining the control points for use in generation of the tone curve, the second value is made greater than in a case when the judgment step does not judge that illuminance of the shooting environment is low, wherein, when the point light source detecting step detects a component originating from a point light source, the determination step changes a luminance, which is a starting point in determining a percentage from the high-luminance side, to a lower luminance side than in a case when the point light source detecting step detects no component originating from a point light source, and wherein the histogram detecting step, the determination step, the tone curve generating step, the image processing step, the judgment step, and the point light source detecting step are implemented by at least one processor executing at least one program recorded on a memory.

\* \* \* \* \*